United States Patent
Johannesson

(10) Patent No.: US 6,397,893 B1
(45) Date of Patent: Jun. 4, 2002

(54) EASILY BENDABLE TUBING FOR TWO SEPARATE FLUIDS

(75) Inventor: Leif Johannesson, Tumba (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 09/786,112

(22) PCT Filed: Aug. 30, 1999

(86) PCT No.: PCT/SE99/01486
§ 371 (c)(1),
(2), (4) Date: Mar. 1, 2001

(87) PCT Pub. No.: WO00/12924
PCT Pub. Date: Mar. 9, 2000

(30) Foreign Application Priority Data

Sep. 1, 1998 (SE) .................................................. 9802941

(51) Int. Cl.⁷ ............................... F16L 11/11; A01J 5/04
(52) U.S. Cl. ........................ 138/115; 138/116; 138/119; 119/14.23; 119/14.25; 119/14.51
(58) Field of Search ................................. 138/115, 116, 138/111, 119; 119/14.18, 14.2, 14.23, 14.25, 14.51, 14.54

(56) References Cited

U.S. PATENT DOCUMENTS

| | | | | |
|---|---|---|---|---|
| 1,813,039 A | * | 7/1931 | Escol | 138/121 |
| 2,012,766 A | * | 8/1935 | Meyer | 138/121 |
| 2,236,171 A | * | 3/1941 | Garretson | 138/111 |
| 2,420,221 A | | 5/1947 | Bell | |
| 2,621,075 A | * | 12/1952 | Sedar | 138/111 |
| 2,814,529 A | * | 11/1957 | Arnt | 138/111 |
| 3,726,253 A | * | 4/1973 | Duncan | 119/14.18 |
| 3,907,002 A | | 9/1975 | Gülich | |
| 3,958,584 A | * | 5/1976 | Jones | 119/14.18 |
| 4,273,070 A | * | 6/1981 | Hoefelmayr | 138/111 |
| 4,995,759 A | * | 2/1991 | Plowman et al. | 138/111 |
| 5,407,300 A | * | 4/1995 | Guindon et al. | 138/111 |

FOREIGN PATENT DOCUMENTS

| | | |
|---|---|---|
| DE | 2 025 337 | 12/1971 |
| SE | 343096 | 2/1972 |

* cited by examiner

Primary Examiner—James Hook
(74) Attorney, Agent, or Firm—Young & Thompson

(57) ABSTRACT

An easily bendable tubing for conducting two separate fluids, which tubing (18) comprises two laterally spaced flexible tubes (50, 52) which are spaced apart and kept together alongside each other by a connection (54) between them. On opposite sides of the tubing (18) there are provided, in the tube wall of each tube, transverse, spaced apart recesses (62) arranged at the side of each other in a respective row along each tube (50, 52). The recesses in each tube (50 or 52) are straight grooves (62) extending at right angles to the longitudinal axis (58 or 60) of the tube and are arranged at regular intervals along the tubes. These straight grooves are disposed in at least one plane parallel to and spaced from a plane containing the central longitudinal axes (58, 60) of the tube.

9 Claims, 3 Drawing Sheets

EASILY BENDABLE TUBING FOR TWO SEPARATE FLUIDS

TECHNICAL FIELD OF THE INVENTION

The present invention relates to an easily bendable tubing or hose for conducting or conveying two separate fluids, such as a liquid and a gas. Such "two-channel" flexible tubings are useful when two separate fluids are to be transported between different although interacting devices or pieces of equipment, which are so located or set up that the distance between them may fluctuate or vary m operation. Another reason for using such easily bendable tubing may be that at least one end thereof has to be connected and disconnected to an interacting device, or e.g. a living creature, from time to time and without difficulty or undue efforts.

BACKGROUND OF THE INVENTION

In connection with e.g. automatic or semi-automatic milking it is well-known prior art to use a lightweight milking unit in the form of a cluster comprising a milk claw provided with four teatcups connected therewith. Each such teatcup is connected with the milk claw by means of the teatcup liner and a flexible vacuum tube or line for providing the pulsating vacuum within the teatcup.

In order to facilitate the handling of the cluster and the four teatcups thereof—especially during the connection and disconnection of the teatcups with/from the cow's teats—it is desirable that the liner's hose-like milk discharge tube portion as well as the vacuum line are both easily bendable or flexible and constitute light-weight components. It is of course always highly desirable that the teatcups affect the teats with as low pulling and bending forces or loads as possible, so that a gentle treatment of the cow (and thereby optimal conditions for good udder health) can be obtained.

However, it is not possible to reduce the weight and stiffness of the liner's hose-like milk discharge tube portion and the vacuum line merely by reducing the thickness of the wall of these two components, since a too small wall thickness will lead to an obvious risk that said tube portion and vacuum line will collapse during bending. This risk is of course particularly great for the vacuum line.

OBJECTS OF THE INVENTION

A primary object of the invention is to provide a new type of easily bendable tubing for conveying two separate fluids (or transferring pressure signals corresponding to the pressures of said fluids) without encountering the above mentioned risk of collapse of the walls of the tubes/lines.

The new type of "two-channel" tubing should preferably be suited for connecting the milk discharge end of a teatcup with a milk claw or any type of equipment (such as tubing or pipes) being part of a milking system, especially an automatic milking system.

However, a tubing of the present novel type may of course also be highly suitable for any use within the industry where an easily bendable tubing is required for hydraulic and/or pneumatic apparatus or machinery.

SUMMARY OF THE INVENTION

According to the present invention the above-mentioned objects are obtained with a tubing comprising two laterally spaced flexible tube means which are spaced apart and kept together alongside each other by connecting means between them, wherein on opposite sides of the tubing there are provided, in the tube wall of each tube means, transverse, spaced apart recesses arranged at the side of each other in a respective row along each tube means. The recesses in each tube means are constituted by straight grooves extending at right angles to the longitudinal axis of the tube means and being arranged at regular intervals along the tube means.

The "straight-groove" layout of the recesses helps to optimize the "easy-to-bend"—characteristics of the tubing.

The connecting means may comprise one or more connecting portions between the two tube means. Said connecting means may for example consist of only one continuous longitudinal web between the tube means, or of several consecutive, longitudinally spaced apart web portions arranged at equal or variable intervals in the region between the tube means. It is even possible to use connecting means in the form of some type of generally known connecting clip, e.g. clips of the type used within the area of hydraulics.

In a preferred embodiment of this type of tubing the tube means are spaced apart at a predetermined distance by a connecting means in the form of a flexible, bandshaped connecting web extending between and along the tube means and being located at least approximately in a plane containing the central longitudinal axes of the tube means, and the recesses comprise at least approximately mutually parallel grooves arranged at intervals of equal or variable size.

The intervals between the recesses in the rows along the tube means may be of different sizes in different parts or regions of the tubing.

A tubing having these features will constitute an easily bendable tubing which can be bent to a small radius without causing collapse of any of the two tube means thereof. Such tubing has proved to be very suitable e.g. as a fluid transfer hose between the milk discharge end of a teatcup and the milking system equipment connected thereto. When the teatcup is attached in use to a teat of an animal, it will hang down vertically from the teat, and the tubing leading from its discharge end will have to be smoothly bent upwards in the form of a U-shaped curve.

Another advantage with a "two-channel" tubing of this type is that it most effectively integrates—in one and the same constructive element—the two tube means thereof. This will in effect make the use of such tubing most convenient, especially in connection with an automatic milking system wherein a milking robot is used for handling the teatcups.

Furthermore, to obtain as far as possible a non-distorted, non-warped bending configuration for the tubing, it is preferable that, on each side of the tubing, every recess in either tube means is directed in line with an adjacent recess in the other tube means.

From a "strength-of-material" point of view it may be convenient to use recesses having V-shaped cross-sections with a smoothly curved transitional bottom portion between the straight side flanks of the V-shape. The angle between the side flanks of the V-shape may preferably amount to about 60°.

If the thickness of the tube walls of the two tube means is e.g. 4,5 mm, it may be suitable to use recesses having a maximal depth of about 3,5 mm.

Preferably, a tubing according to the present invention may be produced by compression moulding of an elastomer.

When using a tubing according to the invention as a connecting tube element between a teatcup and another two-channel hose or other pipes of a milking system, one of the tube means will be adapted to conduct a liquid (i.e. milk), whereas the other tube means will be adapted to conduct a gas (i.e. air), the pressure of which fluctuates and is lower than the ambient atmospheric pressure.

DESCRIPTION OF THE DRAWINGS

The invention will now be further elucidated by means of the following description of a preferred embodiment shown on the enclosed drawings, wherein.

DETAILED DESCRIPTION OF A PREFERRED EMBODIMENT

Figure 1:
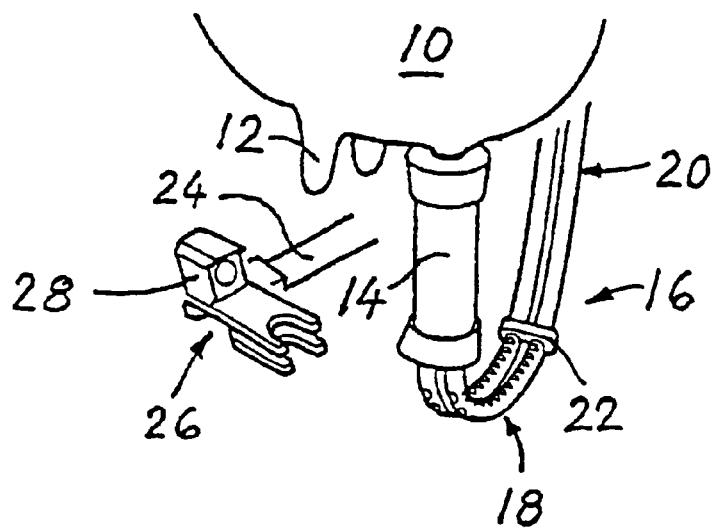
FIG. 1 shows a perspective view of a bent tubing according to the present invention, when the tubing is connected to a teatcup attached to a teat of an animal udder.
Figure 2:
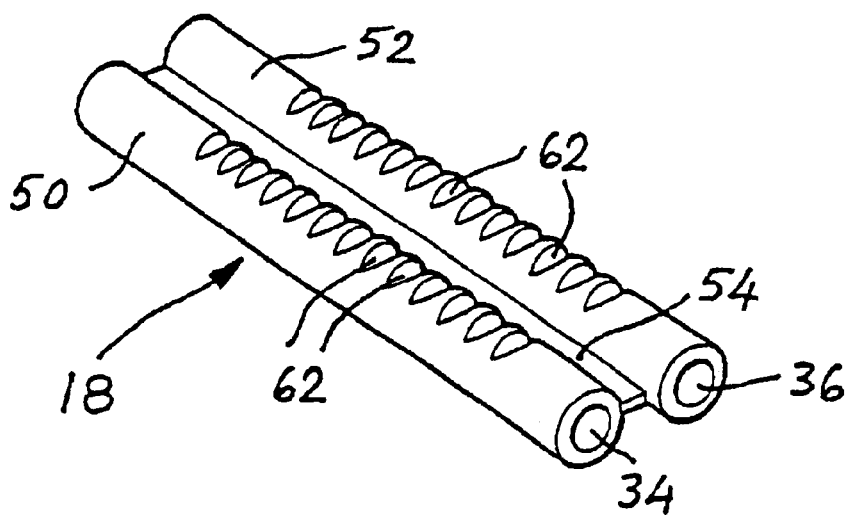
FIG. 2 shows in perspective the tubing of FIG. 1 in a straight, non-bent state.

FIG. 1 shows—in a schematic perspective view—an animal udder 10 with teats 12. On one of these teats there is attached a teatcup 14 from the milk discharge end of which a two-channel tubing 16 extends to a stationary installation of milk- and vacuum pipings (not shown). The tubing 16 comprises a first easily bendable tubing 18 and—downstream thereof—a connected, not so easily bendable second tubing 20. The two tubings 18 and 20 are interconnected by a coupling means 22, which is shown in more detail in FIG. 3.

In this case the teatcup 14 is handled by a milking robot of which there is only shown a robot arm 24 provided with gripper means 26 and a video camera means 28 being part of a control system for the robot arm.

Figure 3:
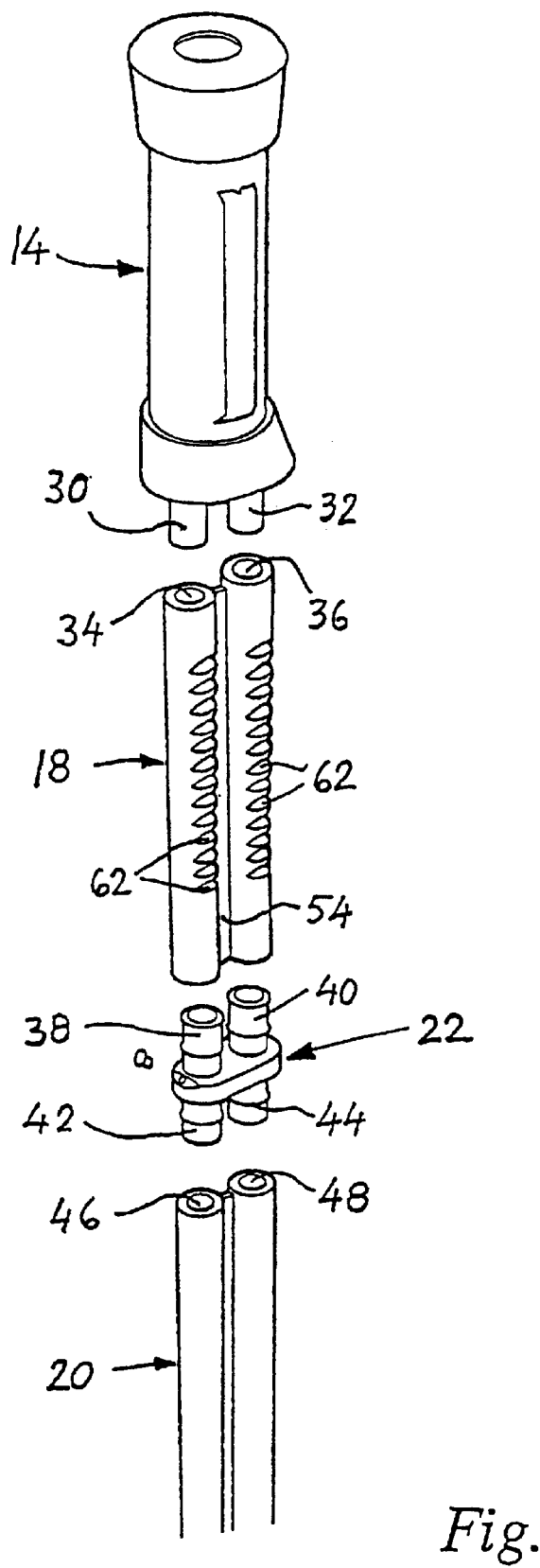
FIG. 3 shows in perspective side view the teatcup of FIG. 1 and the tubing belonging thereto in an axially disassembled state.

The easy-to-bend tubing 18 of the invention is shown at a larger scale and more in detail in FIGS. 2–6. In these figures the tubing 18 is shown in a straight, non-bent state. As shown in FIG. 3, the tubing 18 is to be connected between on one side the teatcup 14 and on the other side the coupling means 22, which in its turn is to be connected with the tubing 20. At its milk discharge end the teatcup 14 is provided with nipples 30 and 32 to be inserted into the two separate fluid channels 34 and 36 of the tubing 18. One channel is adapted to conduct the milk, and the other to conduct a vacuum which is used to operate the teatcup and provide the suction effect of the teatcup on the teat 12.

The coupling means 22 is also provided with connection nipples 38,40,42,44 to be inserted in the fluid channels 34,36 and 46,48 of the tubings 18 and 20, respectively.

As is clear, especially from FIGS. 2 and 4–6, the tubing 18 comprises two spaced apart flexible tube means 50 and 52, which are connected by means of a thin connecting web 54 extending between and along them.

Figure 6:
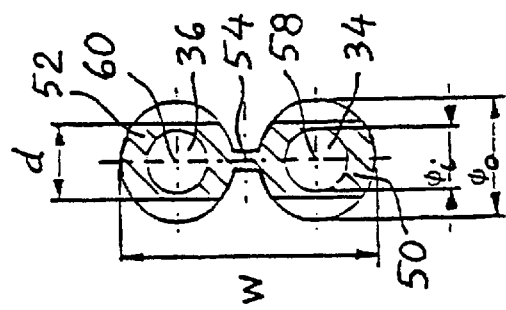
FIG. 6 shows a cross-section of the tubing of FIG. 5, at line 6—6.

As is shown in FIG. 6, the web 54 extends approximately in a center plane 56 in which the longitudinal axes 58,60 of the tube means 50,52 are located.

On its opposite sides the tubing 18 is provided with mutually parallel, groove-like recesses 62 in the tube walls of the tube means 50,52. These recesses, which are formed as straight transverse grooves in the tube means walls, are arranged in a respective row along each side of each tube means.

Figure 4:
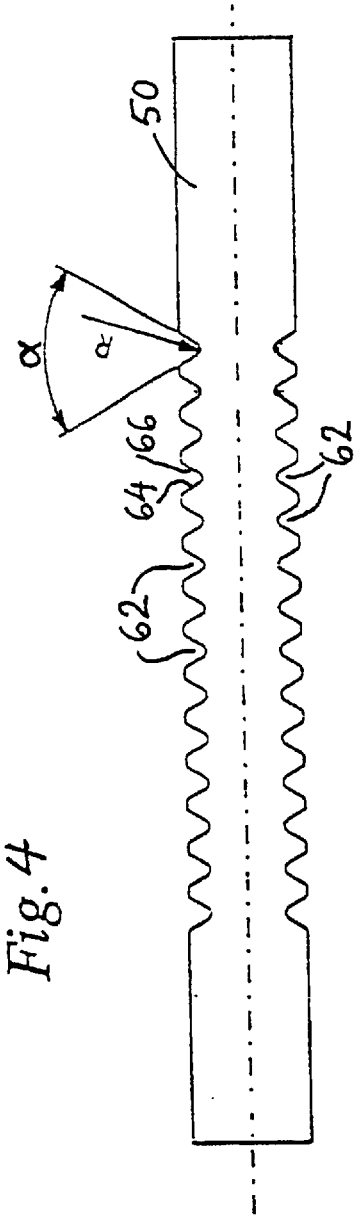
FIG. 4 shows in side view the tubing of FIG. 2.
Figure 5:
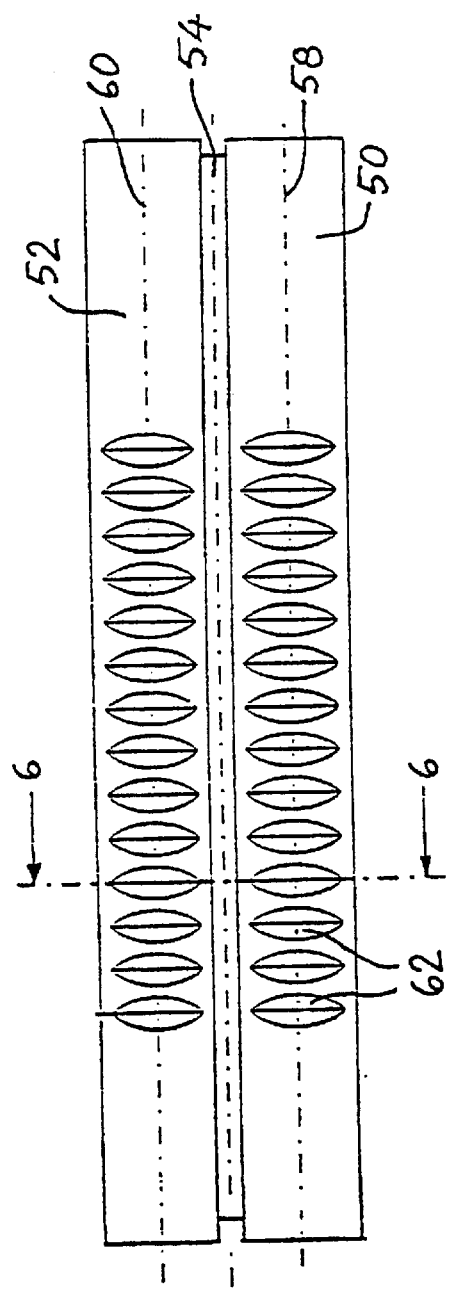
FIG. 5 shows in plan view the tubing of FIG. 4.

To secure symmetrical bending properties for the tubing 18, every recess 62 in either tube means is directed in line with an adjacent recess in the other tube means (see FIG. 5). As is shown in FIG. 4, the recesses 62 have a V-shaped cross-section with a smoothly curved bottom portion R between straight side flank surfaces 64,66. The angle a between these flank surfaces may have a value in the interval from say 30° up to 90°, preferably maybe 60°. As an example of useful dimensions of a tubing 18 used in a robot milking system, it may be said that the width w could be 42 mm, the dimension d=12 mm, and the diameters $\phi_i$=10 mm and $\phi_o$=19 mm.

Owing to the fact that the bendable tubing 18 according to the invention can easily be bent to a rather small radius, it will be possible to handle the teatcups by a milking robot even if the vertical distance (height) between the udder (and teats) and the surface below, on which the animal stands, is very limited.

What is claimed is:

1. An easily bendable tubing for conducting two separate fluids, which tubing (18) comprises two laterally spaced flexible tube means (50, 52) which are spaced apart and kept together alongside each other by connecting means (54) between them, characterized in that on opposite sides of the tubing (18) there are provided, in the tube wall of each tube means, transverse, spaced apart recesses (62) arranged at the side of each other in a respective row along each tube means (50, 52), and the recesses in each tube means (50 or 52) are constituted by straight grooves (62) extending at right angles to the longitudinal axis (58 or 60) of the tube means and being arranged at regular intervals along the tube means, said straight grooves in the rows on each side of the tubing being disposed in a plane parallel to and spaced from a plane containing the central longitudinal axes (58, 60) of the tube means.

2. A tubing according to claim 1, characterized in that the tube means (50, 52) are spaced apart at a predetermined distance by a connecting means in the form of a flexible, band-shaped connecting web (54) extending between and along the tube means (50, 52) and being located at least approximately in said plane containing the central longitudinal axes (58, 60) of the tube means.

3. A tubing according to claim 1, characterized in that the recesses (62) have V-shaped cross-sections with a smoothly curved transitional bottom portion (R) between the straight side flanks (64,66) of the V-shape (α).

4. A tubing according to claim 3, characterized in that the angle (α) between side flanks (64, 66) of the V-shape amounts to about 60°.

5. A tubing according to claim 1, characterized in that on each side of the tubing (18) every recess (62) in either tube means (50 or 52) is directed in line with an adjacent recess in the other tube means (52 or 50).

6. A tubing according to claim 1, characterized in that the tube wall thickness of the tube means is about 4, 5 mm, and the maximal depth of the recesses is about 3, 5 mm.

7. The use of a tubing (18) according to claim 1, for connection between the milk discharge end of a teatcup (14) of a milking system and a hose, pipe or line adapted to convey milk from the teatcup to downstream components of the milking system.

8. An automatic milking system comprising a milking robot arm (24) adapted to handle teatcups (14), an easy-to-bend tubing or tubing element (18) according to claim 7, being attached to the milk discharge end of each teatcup (14), characterized in that one of the tube means (50 or 52) is adapted to conduct a liquid, whereas the other tube means (52 or 50) is adapted to conduct a gas, the pressure of which is lower than the ambient atmospheric pressure.

9. A tubing according to claim 1, characterized in that said straight grooves are disposed in two planes parallel to and spaced equidistant on opposite sides of said plane containing the central longitudinal axes (58, 60) of the tube means.

* * * * *